(12) United States Patent
Pitcher

(10) Patent No.: US 11,401,765 B1
(45) Date of Patent: Aug. 2, 2022

(54) STUFFING BOX COMPRESSION ASSEMBLY

(71) Applicant: Jason Pitcher, Spring, TX (US)

(72) Inventor: Jason Pitcher, Spring, TX (US)

( * ) Notice: Subject to any disclaimer, the term of this patent is extended or adjusted under 35 U.S.C. 154(b) by 0 days.

(21) Appl. No.: 17/568,223

(22) Filed: Jan. 4, 2022

Related U.S. Application Data

(63) Continuation-in-part of application No. 17/361,608, filed on Jun. 29, 2021.

(51) Int. Cl.
*E21B 33/03* (2006.01)

(52) U.S. Cl.
CPC .................................. *E21B 33/03* (2013.01)

(58) Field of Classification Search
CPC ...................................................... E21B 33/03
See application file for complete search history.

(56) References Cited

U.S. PATENT DOCUMENTS

| | | | | | |
|---|---|---|---|---|---|
| 3,762,725 | A | * | 10/1973 | Taylor | F16J 15/185 277/330 |
| 3,967,678 | A | * | 7/1976 | Blackwell | E21B 33/08 73/40 |
| 6,394,461 | B1 | * | 5/2002 | Henderson | F16J 15/185 277/330 |
| 6,412,783 | B1 | * | 7/2002 | Finnestad | F16J 15/187 166/84.1 |

* cited by examiner

*Primary Examiner* — Taras P Bemko
*Assistant Examiner* — Ronald R Runyan
(74) *Attorney, Agent, or Firm* — Bushman Werner, P.C.

(57) ABSTRACT

A compression assembly for maintaining integrity of the seals in a stuffing box. The compression assembly includes a housing which is adapted to connect to the body of a stuffing box. There is an internal annular piston chamber formed in the housing and an annular piston reciprocally disposed in the piston chamber. There is a chamber formed by piston cylinder walls and the top of the piston whereby grease or other fluid under pressure can be introduced so as to exert pressure on the piston and hence movement thereof toward the stuffing box seals. The assembly also comprises a position sensor to monitor travel of the piston.

17 Claims, 4 Drawing Sheets

STUFFING BOX COMPRESSION ASSEMBLY

CROSS REFERENCE TO RELATED APPLICATION

This application is a continuation-in-part of U.S. application Ser. No. 17/361,608 filed on Jun. 29, 2021, the disclosure of which is incorporated herein by reference for all purposes.

FIELD OF THE INVENTION

The present invention relates to stuffing boxes and, more particularly, to a compression assembly which can adjust the compressive force on the seals in a stuffing box.

BACKGROUND OF THE INVENTION

Generally speaking a stuffing box is a housing through which a movable shaft passes. The shaft can be reciprocating or rotating. Disposed in the housing are one or more annular seal rings to seal against the movable shaft.

Turning to FIG. 1, there is shown a stuffing box assembly ('608 Assembly) in accordance with the disclosure of co-pending U.S. application Ser. No. 17/361,608 ('608 Application). The stuffing box assembly shown generally as 10 is seen as being connected to a wellhead adapter shown generally as 12. Stuffing box assembly 10 comprises a stuffing box body 14 having a bore 16 extending therethrough. Body 14 includes an annular flange 18 via which circumferentially spaced bolts 20 can be used to connected body 14 to wellhead adapter 12. In this regard, there is a keeper ring 22 sandwiched between the heads of bolts 20 and flange 18.

Body 14 has an externally threaded neck portion 24 on which is threadedly received a stop nut 26. Also threadedly received on threaded neck portion 24 is a threaded gland nut 28. There is a gland follower 30 which has an external annular rib 32 formed thereon, rib 32 being engaged by gland nut 28 when gland nut 28 is rotated so as to apply a force against annular rib 32 and hence gland follower 30.

Disposed between upper seal stack 36 and lower seal stack 38 is a lantern ring 40. Lantern ring 40 is of conventional design and has a plurality of circumferentially spaced ports 42. As shown, follower 30 has a lower end which engages seal stack 36. Thus, the compression on seal stacks 36 and 38 can be adjusted by actuating piston 62 (see FIGS. 2-4) which in turn urges follower 30 into compressive contact with the seal stacks.

SUMMARY OF THE INVENTION

In one aspect, the present invention relates to a stuffing box assembly and to an apparatus connectable to a stuffing box and adapted to exert compressive force on the seals in the stuffing box.

In another aspect, the present invention relates to a compression assembly which can be removably attached to a stuffing box, the compression assembly being capable of automatic adjustment of the compressive force on the seal rings.

In a further aspect, the present invention relates to a compression assembly for use with a stuffing box wherein the compression assembly can maintain sealing integrity of the seal in the stuffing box.

These and further features and advantages of the present invention will become apparent from the following detailed description, wherein reference is made to the figures in the accompanying drawings.

DETAILED DESCRIPTION OF PREFERRED EMBODIMENTS

Figure 1:
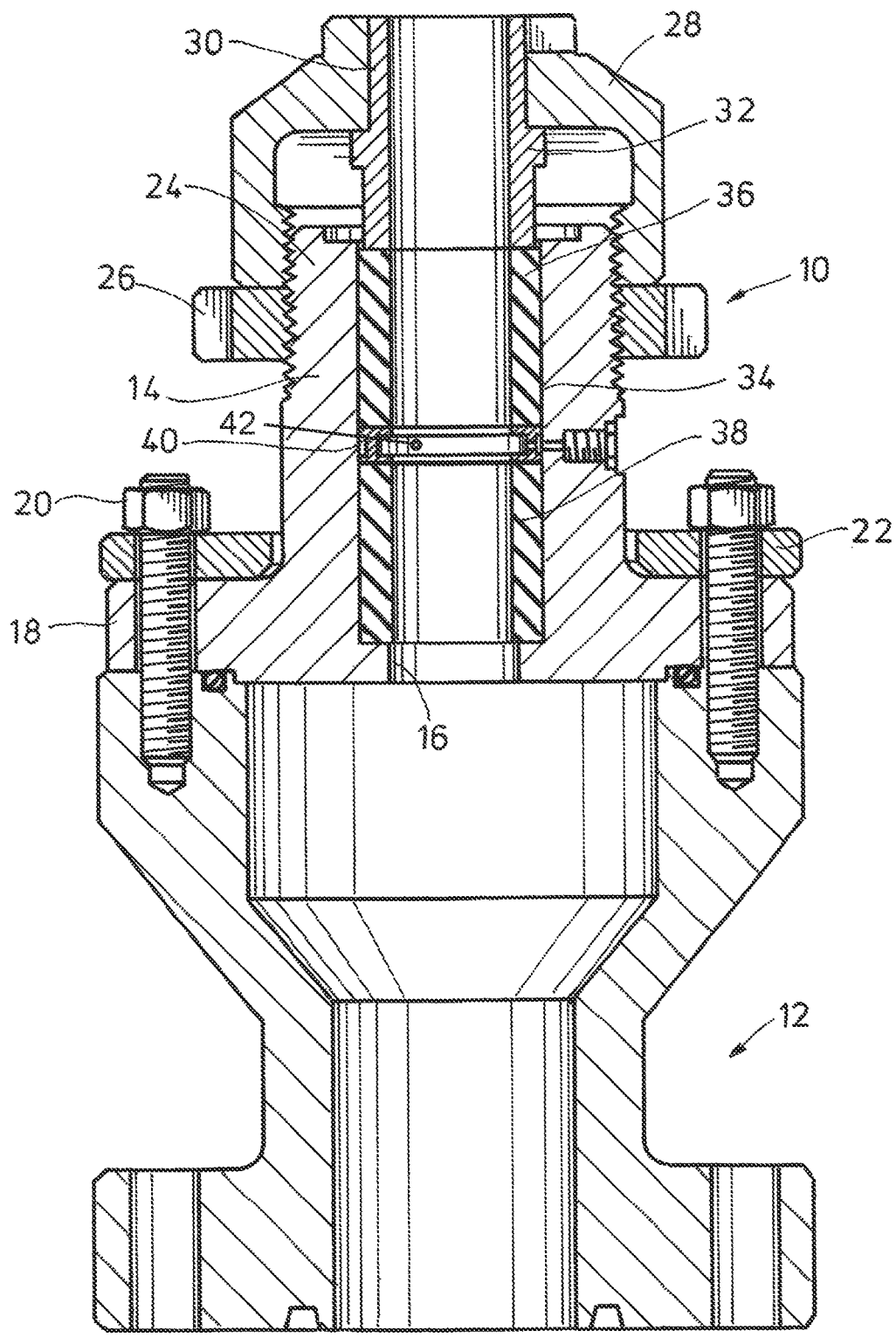
FIG. 1 is an elevational view, partly in section, showing a stuffing box.

Embodiments of the invention are described more fully hereafter with reference to the accompanying drawings. Elements that are identified using the same or similar reference characters refer to the same or similar elements. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 2:
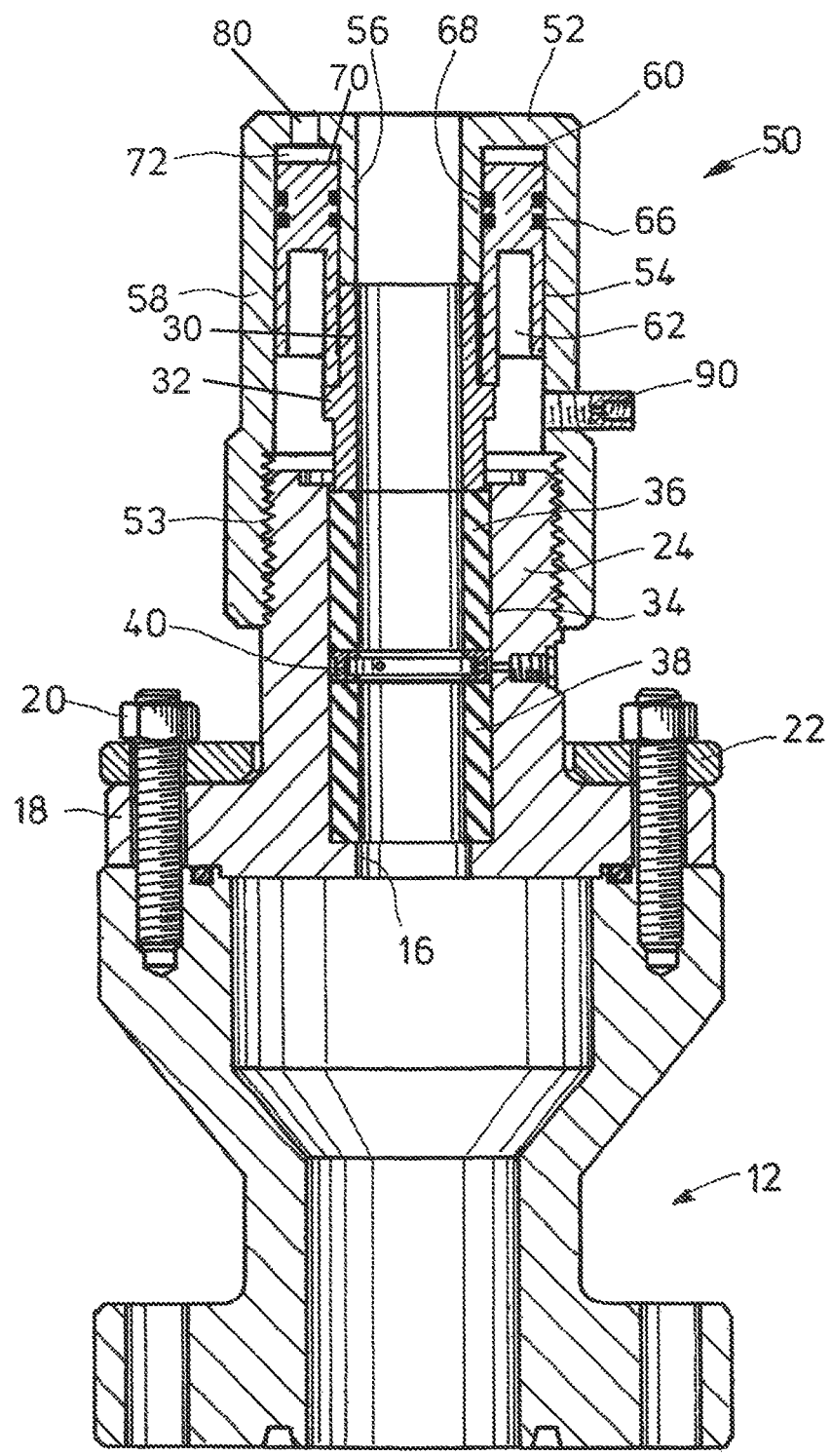
FIG. 2 is an elevational view, partly in section, showing one embodiment of the compression assembly of the present invention.

Referring then to FIG. 2, one embodiment of a compression assembly of the present invention is shown generally as 50. The compression assembly comprises an annular housing 52 forming an annular piston cylinder 54. Housing 52 has an internally threaded socket 53 which can be threadedly received on the threaded neck 24 of stuffing box 14. As seen, cylinder 54 is formed by internal, radially inner and outer, generally concentric walls 56 and 58, respectively, and a top wall 60.

Disposed in annular piston chamber 54 is an annular piston 62 which has radially outer and radially inner seals 66 and 68, respectively, to provide a seal between the piston and the walls of the chamber 54. As can be seen, piston 62 has a top surface 70, there being a variable volume chamber 72 formed between the top surface 70 of piston 62 and the top wall 60 of that portion of the housing 52 forming piston chamber 54. Piston 62 has a lower end surface 63 which is engageable with the annular rib 32 formed on follower 30. Follower 30 is tubular and has an inside diameter which is generally the same as the inside diameter of the seal(s) dispose din the stuffing box 14.

There is a port 80 which is open communication with gallery 72. Not shown is a source of a pressurized fluid, e.g., a hydraulic or pneumatic fluid which can be connected to port 80. In a preferred embodiment, the pressurized fluid is a grease. There is a sensor 90 disposed in housing 52, sensor 90 being of a type which can detect the travel of piston 62 from a first, upper position to a second, lower position. In the depiction shown in FIG. 2, the piston is at its uppermost travel location, but if grease or other pressurized fluid is injected into the chamber 72, piston 62, and hence follower 30, will be urged downwardly, i.e., toward sensor 90. At such time as piston 62 travels to the point that it is detected by the senor 90, it indicates that the seals should be checked/replaced since their sealing integrity can no longer be assured.

Sensor 90 can be connected to a suitable controller (not shown) which can provide a signal, local or remote, that the piston has traveled to a point which, at minimum, means the seals need inspection.

In the embodiment shown in FIG. 2, it will be appreciated that the sensor can be a limit switch or a proximity switch. Indeed, the sensor 90 can be of any type which can directly or indirectly determine movement of the piston 62 from a first position wherein piston 62 is substantially at its upward travel path to a second, terminal position, the latter being an indication that the seal needs to be checked, at a minimum.

Figure 3:
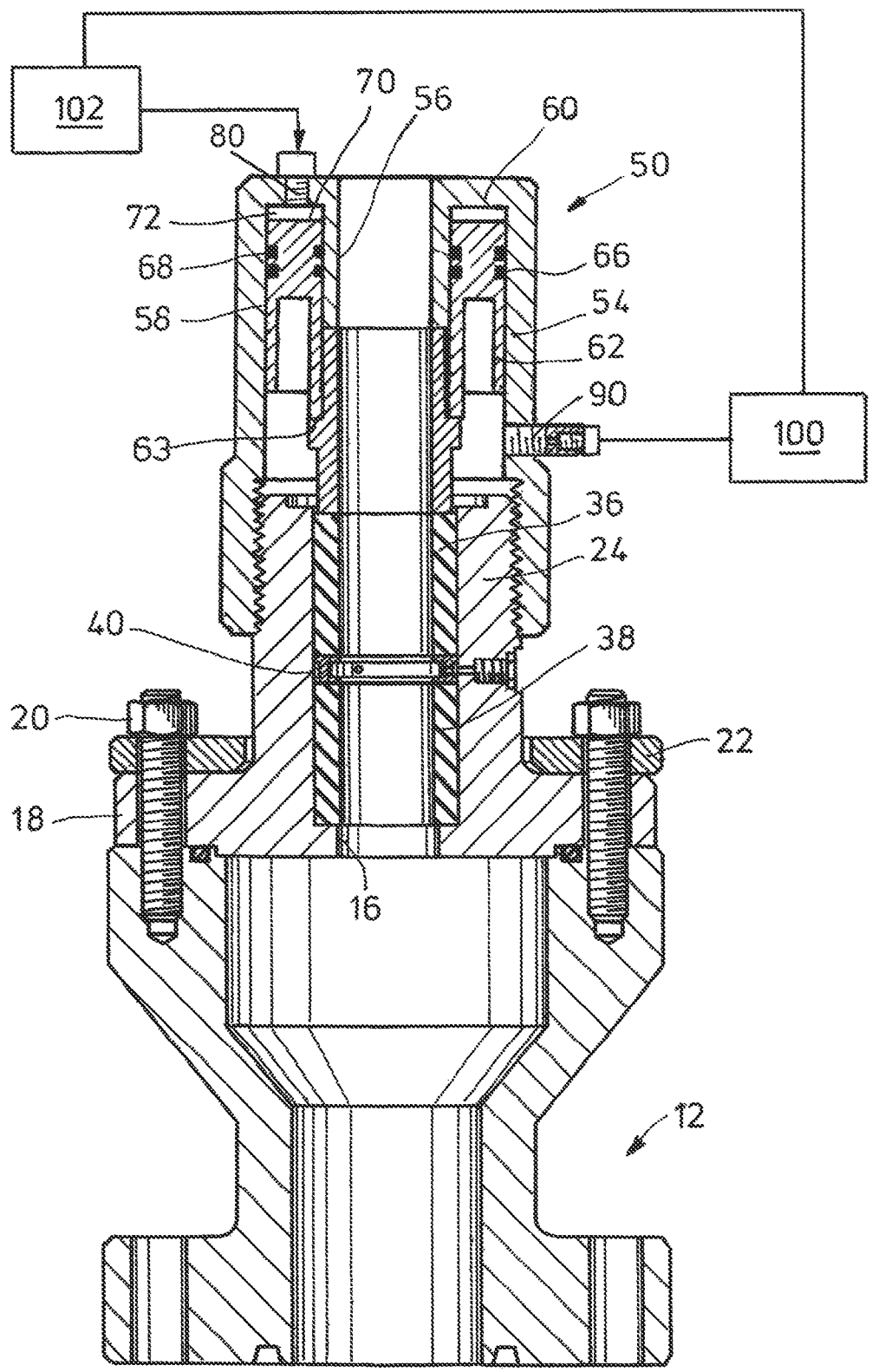
FIG. 3 is a schematic, elevational view, partly in section, of another embodiment of the compression assembly of the present invention.

Turning now to FIG. 3, there is shown yet another embodiment of the compressions assembly of the present invention. The embodiment shown in FIG. 3 is substantially the same as that shown in FIG. 2 except as described hereafter.

In the '608 Assembly, sealing integrity of the seal stacks 36 and 38 can be determined on a continuous basis if desired, as taught in the '608 Application. Returning then to FIG. 3, the output of sensor 90 is connected to a controller 100 which in turn is connected to a source of pressurized fluid shown generally as 102. In a first case, if piston 62 travels to a point where it triggers sensor 90, the signal from sensor 90 will be received by controller 100. In response, controller 100 can, inter alia, set off an alarm, cause pressurized fluid to be injected into chamber 72, send a remote signal or the like. Since controller 100 is electronically connected to pressurized fluid source 102, a signal can be sent from controller 100 to pressurized fluid source 102 for the purpose of triggering more introduction of pressurized fluid into the chamber 72. To this end, pressurized fluid source 102 could include a three-way valve, a check valve, a suitable reservoir of grease or other fluid, and a pressurized injection system, e.g., a pump, to transfer the fluid from the reservoir into the chamber 54. In general, sources of pressurized pneumatic and hydraulic fluids are well known to those skilled in the art and need not be described in detail.

Figure 4:
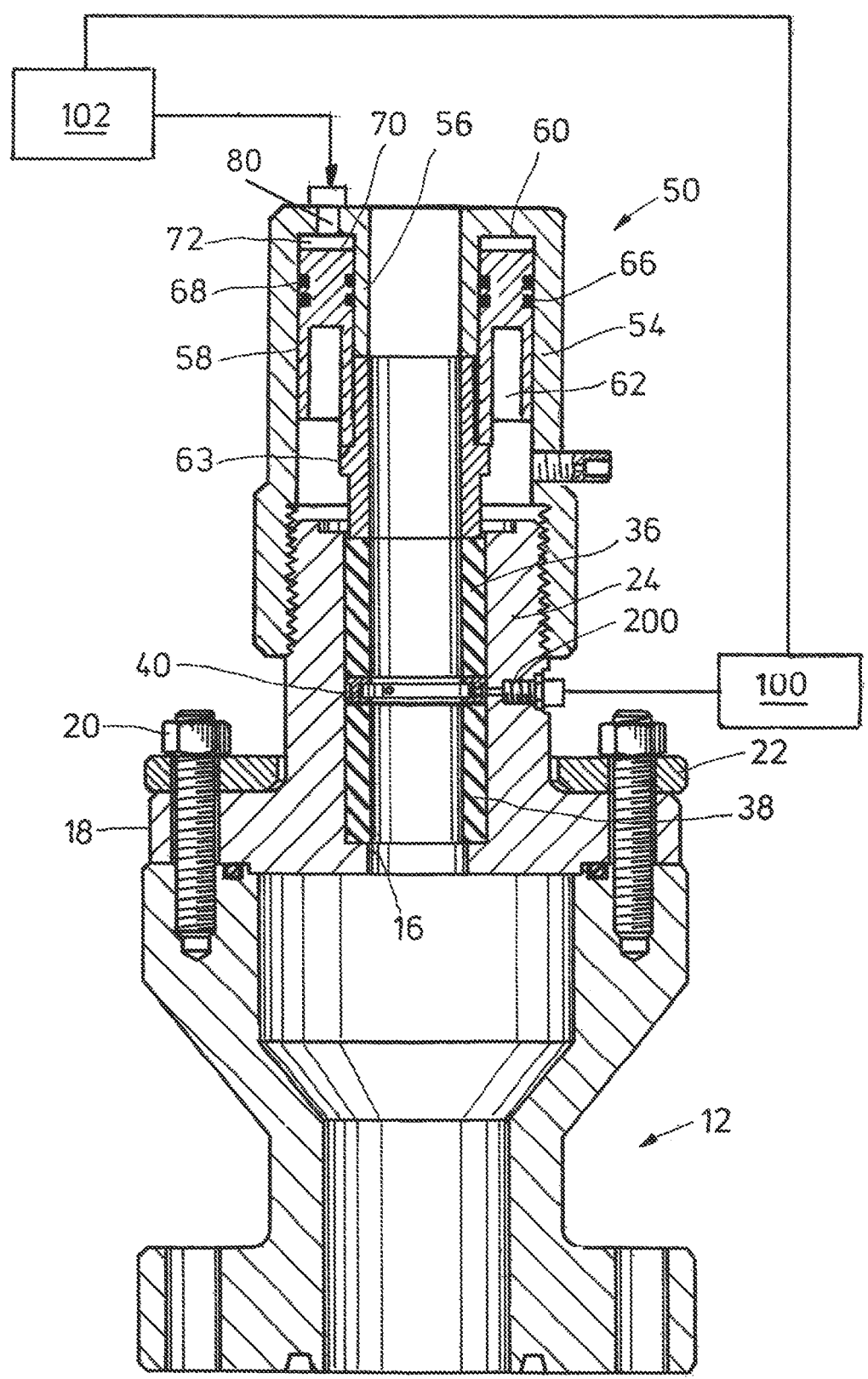
FIG. 4 is a schematic, elevational view partly in section, of another embodiment of the compression assembly of the present invention.

The embodiment of FIG. 4 can be used, as noted, in conjunction with the '608 Assembly, to continuously monitor seal integrity and introduce pressurized fluid from pressurized fluid source 102 into chamber 72 as needed. As taught in the '608 Application, there is a bore 200, preferably threaded, which extends through body 14 and which is in open communication with lantern ring 40, i.e., the detection zone formed between the seal stacks 36 and 38. Not shown is a pressure transducer which can be received in bore 200 or can extend therethrough. Upon receiving a signal from the pressure transducer that the pressure in the detection zone is below a desired level, controller 100 can then signal pressurized fluid zone 102 to activate and inject pressurized fluid into chamber 72.

The compression assembly of the present invention offers many advantages when used with stuffing box assemblies through which extend movable, e.g., reciprocating or rotating, shafts. For one, there are no tools or strenuous manual labor necessary to control compression on the seals in the stuffing box. Thus there are no wrenches required to turn a nut to compress the follower and hence compress the seals. Additionally, the system when married with the '608 Assembly provides a way to continuously and automatically ensure that the seals are under the proper compression without manual checking.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A compression assembly for maintaining sealing integrity of at least one annular seal positioned in the bore of the body of a stuffing box used to seal around a movable shaft, there being a tubular follower disposed in said bore and axially engageable with said annular seal, comprising:
   a housing adapted to connect to the body of a stuffing box, said housing forming an annular piston chamber, said piston chamber being defined by a top wall, and first and second concentric, inner and outer side walls;
   an annular piston disposed in said annular piston chamber, said annular piston having a top end, a variable volume chamber gallery being formed between said top wall of said piston chamber and said top end of said piston, said piston being engageable with said tubular follower to thereby exert a compressive force against said seal.

2. The compression assembly of claim 1, further comprising:
   a fluid system for injecting a pressurized fluid into said chamber.

3. The compression assembly of claim 2 wherein said pressurized fluid is a gas.

4. The compression assembly of claim 2 wherein said pressurized fluid is a liquid.

5. The compression assembly of claim 2, wherein said pressurized fluid is grease.

6. The compression assembly of claim 1, wherein said housing has an internally threaded socket, said socket being threadably connectable to a threaded neck portion of the body of a stuffing box assembly.

7. The compression assembly of claim 1, wherein said follower has an inside diameter substantially the same as the inside diameter of the seal.

8. The compression assembly of claim 1, wherein said sensor comprises a proximity switch.

9. The compression assembly of claim 1, wherein said sensor is configured to generate a signal when said piston moves from a first position to a second position.

10. The compression assembly of claim 9, wherein said signal generated by said sensor is sent to a controller.

11. The compression assembly of claim 10, wherein said controller is configured to trigger an alarm.

12. The compression assembly of claim 1, wherein there is a control system operatively connected to said sensor, said control system being connectable to a pressurized fluid system.

13. The compression assembly of claim 12, wherein said pressurized fluid system is operative to inject a pressurized fluid into said chamber.

14. The compression assembly of claim 1, wherein there is a pressure transducer connected to said stuffing box and operative to determine pressure on the seals in the stuffing box and to generate a signal representative thereof.

15. The compression assembly of claim 14, wherein there is a controller connected to said transducer.

16. The compression assembly of claim 15, wherein said controller is connected to a pressurized fluid system.

17. The compression assembly of claim 16, wherein said pressurized fluid system is operative to inject a pressurized fluid into said chamber in response to a command signal from said controller.

\* \* \* \* \*